United States Patent
Albean

(10) Patent No.: US 7,499,392 B2
(45) Date of Patent: Mar. 3, 2009

(54) OFDM EQUALIZER FILTER WITH SHARED MULTIPLIER

(75) Inventor: David Lawrence Albean, Indianapolis, IN (US)

(73) Assignee: Thomson Licensing, Boulogne, Billancourt (FR)

( * ) Notice: Subject to any disclaimer, the term of this patent is extended or adjusted under 35 U.S.C. 154(b) by 339 days.

(21) Appl. No.: 10/514,090

(22) PCT Filed: May 8, 2003

(86) PCT No.: PCT/US03/14506

§ 371 (c)(1), (2), (4) Date: Nov. 10, 2004

(87) PCT Pub. No.: WO03/098854

PCT Pub. Date: Nov. 27, 2003

(65) Prior Publication Data

US 2005/0185573 A1    Aug. 25, 2005

Related U.S. Application Data

(60) Provisional application No. 60/380,621, filed on May 15, 2002.

(51) Int. Cl.
*H04J 11/00* (2006.01)

(52) U.S. Cl. .................................. 370/206; 370/343

(58) Field of Classification Search ................. 370/203, 370/206, 343
See application file for complete search history.

(56) References Cited

U.S. PATENT DOCUMENTS

| | | | |
|---|---|---|---|
| 5,483,529 A | 1/1996 | Baggen et al. | |
| 5,757,766 A | 5/1998 | Sugita | |
| 6,141,393 A | 10/2000 | Thomas et al. | |
| 6,434,163 B1 | 8/2002 | Fernando et al. | |
| 6,630,862 B1 * | 10/2003 | Perthold et al. | 330/149 |
| 7,065,700 B2 * | 6/2006 | Kim et al. | 714/790 |
| 7,142,616 B2 * | 11/2006 | Ouchi et al. | 375/316 |
| 7,146,396 B2 * | 12/2006 | Rainish | 708/813 |

OTHER PUBLICATIONS

Search Report Dated Sep. 11, 2003.

* cited by examiner

*Primary Examiner*—Brian D Nguyen
(74) *Attorney, Agent, or Firm*—Robert D. Shedo; Vincent E. Duffy; Michael A. Pugel

(57) ABSTRACT

An apparatus for OFDM communications includes an equalizer filter configured to receive input data and to apply a tap setting to the input data to generate output data. The input data includes a first real component and a first imaginary component. The tap setting includes a second real component and a second imaginary component. The output data includes a third real component and a third imaginary component, and the third real component is time-multiplexed with the third imaginary component. A method for OFDM communications includes applying a tap setting to input data to generate output data.

4 Claims, 5 Drawing Sheets

| Output number (n) | Real part of input ($a_n$) | Imaginary part of input ($b_n$) | Real part of tap setting ($c_n$) | Imaginary part of tap setting ($d_n$) | Shared multiplier output ($I_n$, $Q_n$) |
|---|---|---|---|---|---|
| 1 | 1 | −2 | 1 | 2 | 5 |
| 2 | 1 | −2 | 1 | 2 | 0 |
| 3 | −2 | −2 | 2 | 3 | 2 |
| 4 | −2 | −2 | 2 | 3 | −10 |
| 5 | 3 | 4 | 3 | −4 | 25 |
| 6 | 3 | 4 | 3 | −4 | 0 |
| 7 | 10 | −3 | −2 | 9 | 7 |
| 8 | 10 | −3 | −2 | 9 | 96 |
| 9 | 5 | 6 | 3 | 6 | −21 |
| 10 | 5 | 6 | 3 | 6 | 48 |

OFDM EQUALIZER FILTER WITH SHARED MULTIPLIER

PRIORITY CLAIM

This application claims the benefit, under 35 U.S.C. § 365 of International Application PCT/US03/14506, filed May 8, 2003, which was published in accordance with PCT Article 21(2) on Nov. 27, 2003 in English and which claims the benefit of U.S. Provisional Patent Application No. 60/380,621 filed May 15, 2002.

FIELD OF THE INVENTION

The present invention relates to processing orthogonal frequency division multiplexed ("OFDM") signals.

BACKGROUND OF THE INVENTION

An increasingly wide range of transmission technologies are available for use in modern electronic communication systems. Contemporary options include multicarrier, spread spectrum, narrowband, and infrared technologies. Although each technology has its own advantages and disadvantages, one particular type of multicarrier transmission—orthogonal frequency division multiplexing ("OFDM")—has proven to be an exceptionally robust technique for efficiently transmitting data in many applications. OFDM uses a plurality of subcarrier frequencies ("subcarriers") to transmit data within a channel bandwidth. In contrast to less sophisticated frequency division multiplexing ("FDM") techniques, which can waste portions of the bandwidth for separation and isolation of subcarrier frequency spectra and avoidance of inter-carrier interference ("ICI"), OFDM increases bandwidth efficiency by significantly overlapping the frequency spectra of its subcarriers within the channel bandwidth. OFDM allows resolution and recovery of the baseband information that has been modulated onto each subcarrier even though the frequency spectra are overlapped. Furthermore, in addition to the more efficient spectrum usage, OFDM provides several other advantages, including a tolerance to multi-path delay spread and frequency selective fading, good interference properties, and relatively simplified frequency-domain processing of the received signals.

For processing, an OFDM receiver typically converts a received signal from the time-domain into frequency-domain representations of the signal. Generally, conventional OFDM receivers accomplish this by sampling the time-domain signal and then applying Fast Fourier Transforms ("FFTs") to blocks of the samples. The resulting frequency-domain data typically includes a complex value (e.g., magnitude component and phase component, or real component and imaginary component) for each respective subcarrier. Then, the receiver typically applies an equalizer to the frequency-domain representations of the received signal before recovering the baseband data that has been modulated onto each subcarrier. The equalizer can correct for multi-path distortion effects of the channel through which the OFDM signal was transmitted. Some receivers may also use the equalizer to correct for other problems encountered with OFDM communications, such as, for example, carrier frequency offset (i.e., a difference between the transmitter and receiver frequencies), and/or sampling frequency offset (i.e., a difference between the transmitter and receiver sampling clock frequencies). Carrier frequency offset and sampling frequency offset can result in a loss of orthogonality between the subcarriers, which results in inter-carrier interference ("ICI") and a severe increase in the bit error rate ("BER") of the data recovered by the receiver.

FIG. 1 (Prior Art) is a block diagram of a conventional multiplier 10 for an OFDM equalizer tap. A typical OFDM equalizer has one or more filters (or "taps") which receive a tap setting corresponding to a complex correction (e.g., a real correction and an imaginary correction, or a magnitude correction and a phase correction) for each subcarrier (or "subchannel"). The equalizer outputs are typically real ("I") and imaginary ("Q") signal components for each subcarrier. Historically, separate I and Q outputs have been provided by an architecture that requires at least four multipliers to multiply the respective complex data input (a+jb) by the respective complex tap setting (c+jd). But, implementing even a single multiplier in digital integrated circuitry requires a large number of logic gates. Consequently, the high number of multipliers that has historically been required to fashion an equalizer has undesirably added to the size and cost of OFDM receiver circuitry. The present invention is directed to overcoming this problem.

SUMMARY OF THE INVENTION

An apparatus for OFDM communications includes an equalizer filter (100) configured to receive input data and to apply a tap setting to the input data to generate output data. The input data includes a first real component and a first imaginary component. The tap setting includes a second real component and a second imaginary component. The output data includes a third real component and a third imaginary component, and the third real component is time-multiplexed with the third imaginary component.

A method for OFDM communications includes receiving input data and applying a tap setting to the input data to generate output data. The input data includes a first real component and a first imaginary component. The tap setting includes a second real component and a second imaginary component. The output data includes a third real component and a third imaginary component, and the third real component is time-multiplexed with the third imaginary component.

BRIEF DESCRIPTION OF THE DRAWINGS

In the drawings:

FIG. 5 is a table listing hypothetical data for exemplary operations of the exemplary equalizer filter with shared multiplier of FIG. 3.

DETAILED DESCRIPTION OF THE PREFERRED EMBODIMENT

The characteristics and advantages of the present invention will become more apparent from the following description, given by way of example. To this end, it is noted that for clarity of exposition at times the invention may be discussed in terms of a single subcarrier. However, it should be readily appreciated that the invention may be suitably configured and used to sequentially process data from a plurality of subcarriers, and/or various components of the present invention may be suitably configured, replicated, and/or coupled to parallel process data from a plurality of subcarriers.

Figure 1:
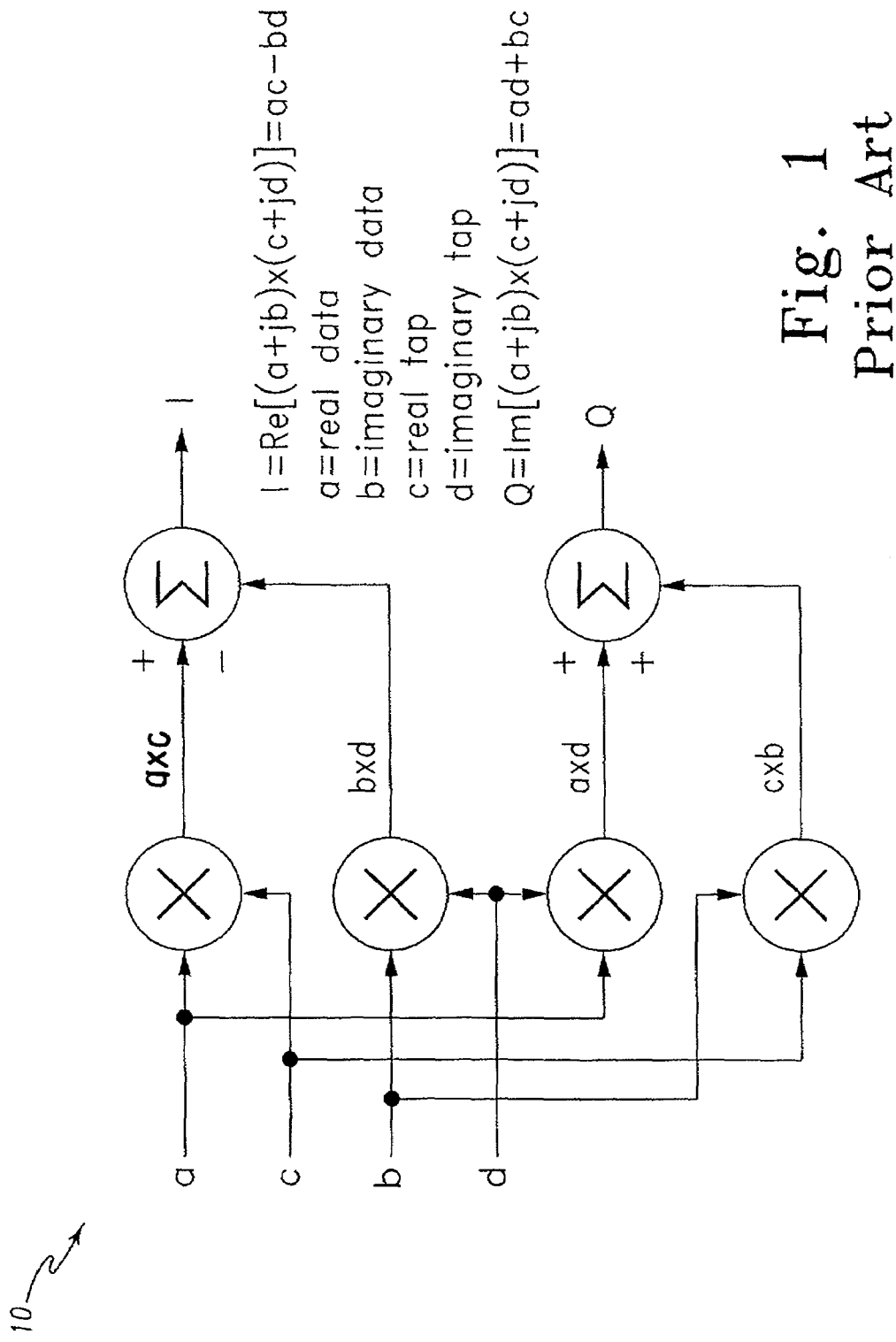
FIG. 1 (Prior Art) is a block diagram of a conventional multiplier for an OFDM equalizer tap.
Figure 2:
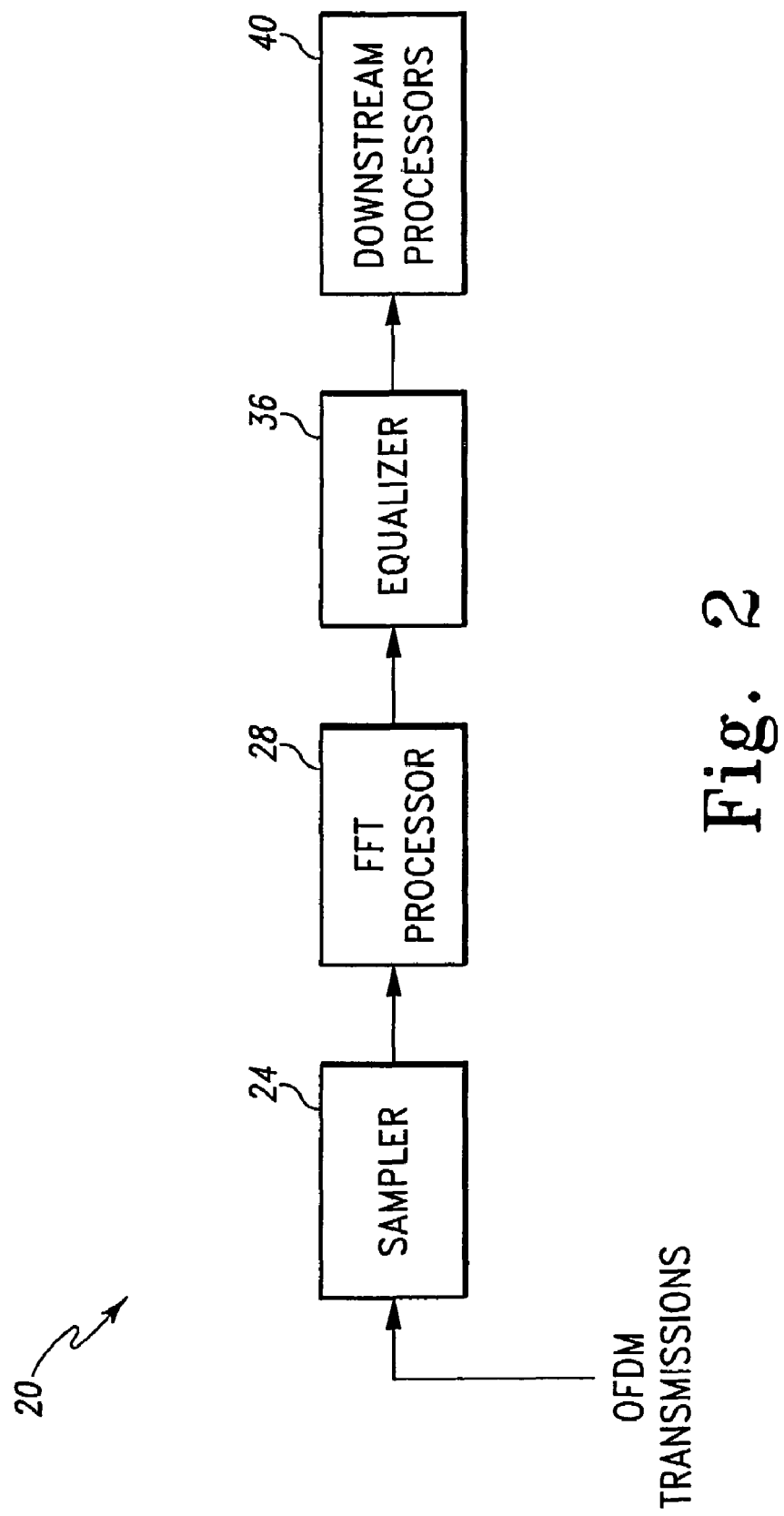
FIG. 2 is a block diagram of an exemplary OFDM receiver including an equalizer according to the present invention.

FIG. 2 is a block diagram of an exemplary OFDM receiver 20 including an equalizer 36 according to the present invention. In addition to equalizer 36, OFDM receiver 20 includes a sampler 24, an FFT processor 28, and downstream processors 40. In general, OFDM receiver 20 is configured to receive OFDM transmissions and recover baseband data therefrom. The received transmissions may conform to the proposed ETSI-BRAN HIPERLAN/2 (Europe) and/or the IEEE 802.11a (USA) wireless LAN standards, which are herein incorporated by reference, or they may conform to any other OFDM protocols or standards. Further, it should be readily appreciated that the various components of OFDM receiver 20 may be suitably interconnected, as, known, by various control inputs and outputs (not shown) for the communication of various externally and/or internally generated control settings. For example, FFT processor 28 may include a suitable input for receiving window synchronization settings.

Sampler 24 is configured to receive transmitted OFDM signals and generate time-domain samples or data therefrom. Accordingly, sampler 24 includes suitable input signal conditioning and a suitable analog-to-digital converter ("ADC"). FFT processor 28 is coupled to sampler 24 to receive the time-domain data therefrom. FFT processor 28 is configured generate frequency-domain representations or data from the time-domain data by performing FFT operations on blocks of the time-domain data.

Equalizer 36 is coupled to FFT processor 28 to receive the frequency-domain data therefrom. In general, equalizer 36 is configured to reduce the multi-path distortion effects of the channel through which the OFDM signals have been transmitted. To this end, equalizer 36 includes one or more taps which are configured to store tap settings for the respective subchannels. Equalizer 36 may include tap initialization features, tap adaptation features, and/or other features for obtaining the tap settings, as known in the art. Equalizer 36 also includes one or more of an equalizer filter with shared multiplier 100, which is discussed in further detail below. Further, equalizer 36 includes a controller state machine which is configured to toggle or alternate two states of a control signal, SEL, during operation as discussed further below.

Downstream processors 40 are coupled to equalizer 36 to receive the equalized frequency-domain data therefrom. Downstream processors 40 are configured to recover baseband data that was included in the transmitted OFDM signals. It should be appreciated that as the present invention provides multiplexed real and imaginary data components (as discussed in further detail below), downstream processors 40 may include suitable pipelining registers and/or a suitable demultiplexing circuitry.

In overall operation of OFDM receiver 20, sampler 24 receives OFDM signals and generates time-domain data therefrom. FFT processor 28 generates frequency-domain data from the time-domain data by performing FFT operations on blocks of the time-domain data. Generally, equalizer 36 reduces multi-path distortion effects of the OFDM transmission channel. Downstream processors 40 receive the corrected data from equalizer 36 and recover the baseband data that was included in the transmitted OFDM signals. Operations of exemplary equalizer filter with shared multiplier 100 are discussed in further detail below.

Figure 3:
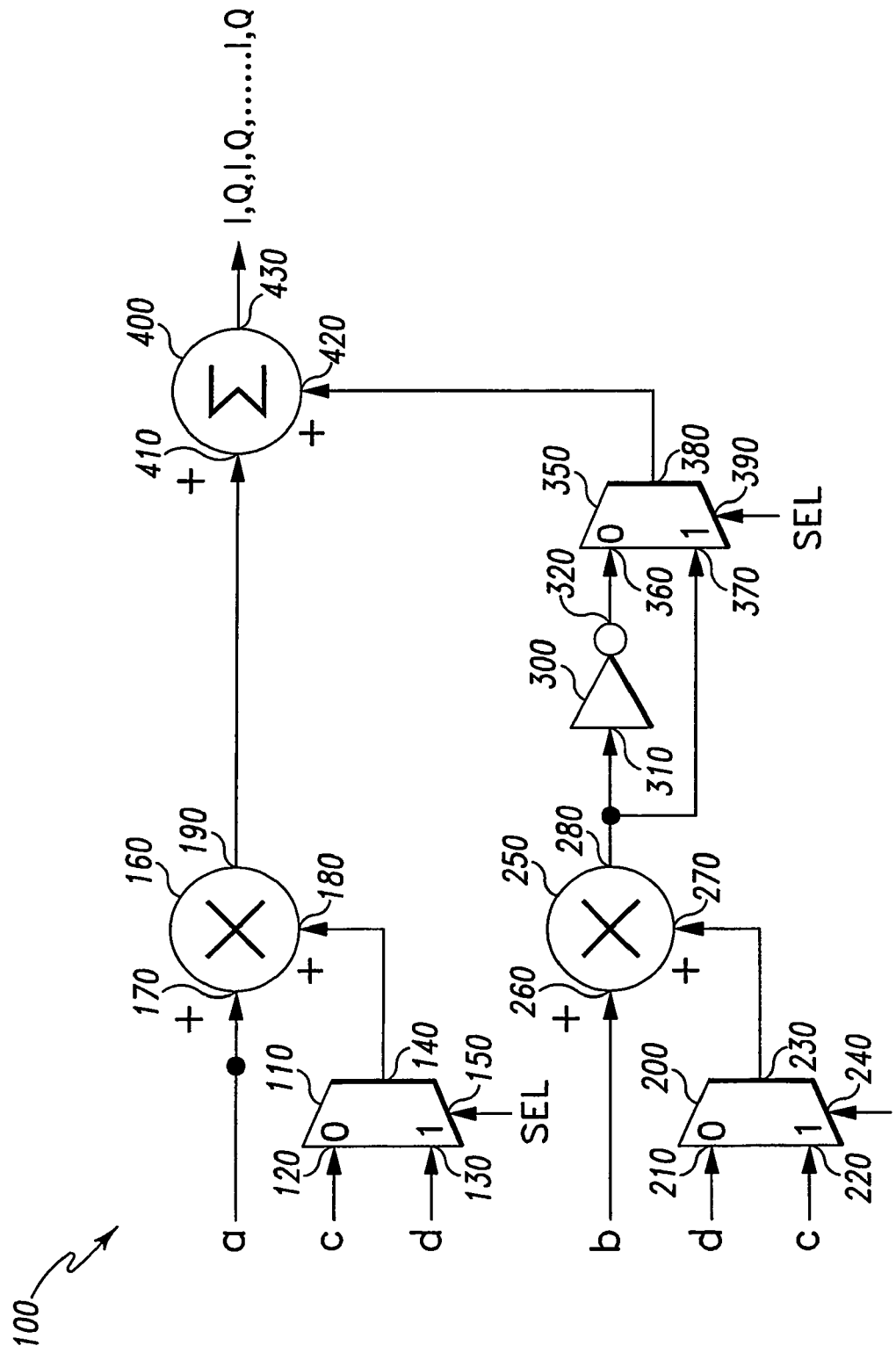
FIG. 3 is a block diagram of an exemplary equalizer filter with shared multiplier for the exemplary equalizer of FIG. 2.

FIG. 3 is a block diagram of an exemplary equalizer filter with shared multiplier 100 for the exemplary equalizer 36 of FIG. 2. In general, equalizer filter with shared multiplier 100 is configured to generate a multiplexed real component ("I") and imaginary component ("Q") data stream (i.e., $I_1, Q_1, I_2, Q_2, I_3, Q_3, \ldots I_{n-1}, Q_{n-1}, I_n, Q_n$) that represents a multiplication of a respective complex data input stream, $(a_n+jb_n)$, by a respective complex tap setting data, $(c_n+jd_n)$. Equalizer filter 100 includes a multiplexer 110. Multiplexer 110 includes a data input 120, a data input 130, a data output 140, and a control input 150. Multiplexer 110 is arranged to receive the real component of the tap setting at data input 120, arranged to receive the imaginary component of the tap setting at data input 130, arranged to receive a control signal at control input 150, configured to provide the real component of the tap setting at data output 140 in response to a first state of the control signal, and configured to provide the imaginary component of the tap setting at data output 140 in response to a second state of the control signal. To this end, the first state of the control signal is a logical 0 or any other suitable state, and the second state of the control signal is a logical 1 or any other suitable state.

Equalizer filter 100 further includes a multiplier 160. Multiplier 160 includes a data input 170, a data input 180 coupled to data output 140 of multiplexer 110, and a data output 190. Multiplier 160 is arranged to receive the real component of the input data at data input 170, arranged to receive the provided one of the real component of the tap setting and the imaginary component of the tap setting at data input 180, and configured to provide a first result at data output 190, where the first result corresponds to a multiplication of data received at data input 170 by data received at data input 180.

Equalizer filter 100 further includes a multiplexer 200. Multiplexer 200 includes a data input 210, a data input 220, a data output 230, and a control input 240 coupled to control input 150 of multiplexer 110. Multiplexer 200 is arranged to receive the imaginary component of the tap setting at data input 210, arranged to receive the real component of the tap setting at data input 220, arranged to receive the control signal at control input 240, configured to provide the imaginary component of the tap setting at data output 230 in response to the first state of the control signal, and configured to provide the real component of the tap setting at data output 230 in response to the second state of the control signal.

Equalizer filter 100 further includes a multiplier 250. Multiplier 250 includes a data input 260, a data input 270 coupled to data output 230 of multiplexer 200, and a data output 280. Multiplier 250 is arranged to receive the imaginary component of the input data at data input 260, arranged to receive the provided one of the imaginary component of the tap setting and the real component of the tap setting at data input 270, and configured to provide a second result at data output 280, where the second result corresponds to a multiplication of data received at data input 260 by data received at data input 270.

Equalizer filter 100 further includes an inverter 300. Inverter 300 includes a data input 310 coupled to data output 280 of multiplier 250 and further includes a data output 320. Inverter 300 is configured to provide a third result at data output 320, where the third result corresponds to a magnitude of data received at data input 310 and an opposite sign from the data received at data input 310.

Equalizer filter 100 further includes a multiplexer 350. Multiplexer 350 includes a data input 360 coupled data output 320 of inverter 300, a data input 370 coupled to data output 280 of multiplier 250, a data output 380, and a control input 390 coupled to control input 150 of multiplexer 110 and control input 240 of multiplexer 200. Multiplexer 350 is arranged to receive the control signal at control input 390, configured to provide data received at data input 360 at data output 380 in response to the first state of the control signal, and configured to provide data received at data input 370 at data output 380 in response to the second state of the control signal.

Equalizer filter 100 also includes a summer 400. Summer 400 includes a data input 410 coupled to data output 190 of multiplier 160, a data input 420 coupled to data output 380 of multiplexer 350, and a data output 430. Summer 400 is configured to provide a fourth result at data output 430, where the fourth result corresponds to a summation of data received at data input 410 with data received at data input 420.

Thus, in operation of exemplary equalizer filter with shared multiplier 100, equalizer 36 alternates the states of the SEL control signal to control the three multiplexers. The multiplexing actions provide alternating samples of (a*c) and (a*d) at data output 190 of multiplier 160, and provide respective alternating samples of (b*d) and (b*c) at data output 280 of multiplier 250. Further, multiplexer 350 provides respective −(b*d) or +(b*c) data to summer 400. The resulting data stream at output 430 of summer 400 is a multiplexed I, Q data stream (i.e., $I_1, Q_1, I_2, Q_2, I_3, Q_3, \ldots I_{n-1}, Q_{n-1}, I_n, Q_n$), where:

$$I_n = \text{Real}[(a_n+jb_n)^*(c_n+jd_n)] = (a_n{}^*c_n) - (b_n{}^*d_n)$$

$$Q_n = \text{Imag}[(a_n+jb_n)^*(c_n+jd_n)] = (a_n{}^*d_n) + (b_n{}^*c_n)$$

FIG. 5 is a table listing hypothetical data for exemplary operations of the exemplary equalizer filter with shared multiplier 100 of FIG. 3.

Figure 4:
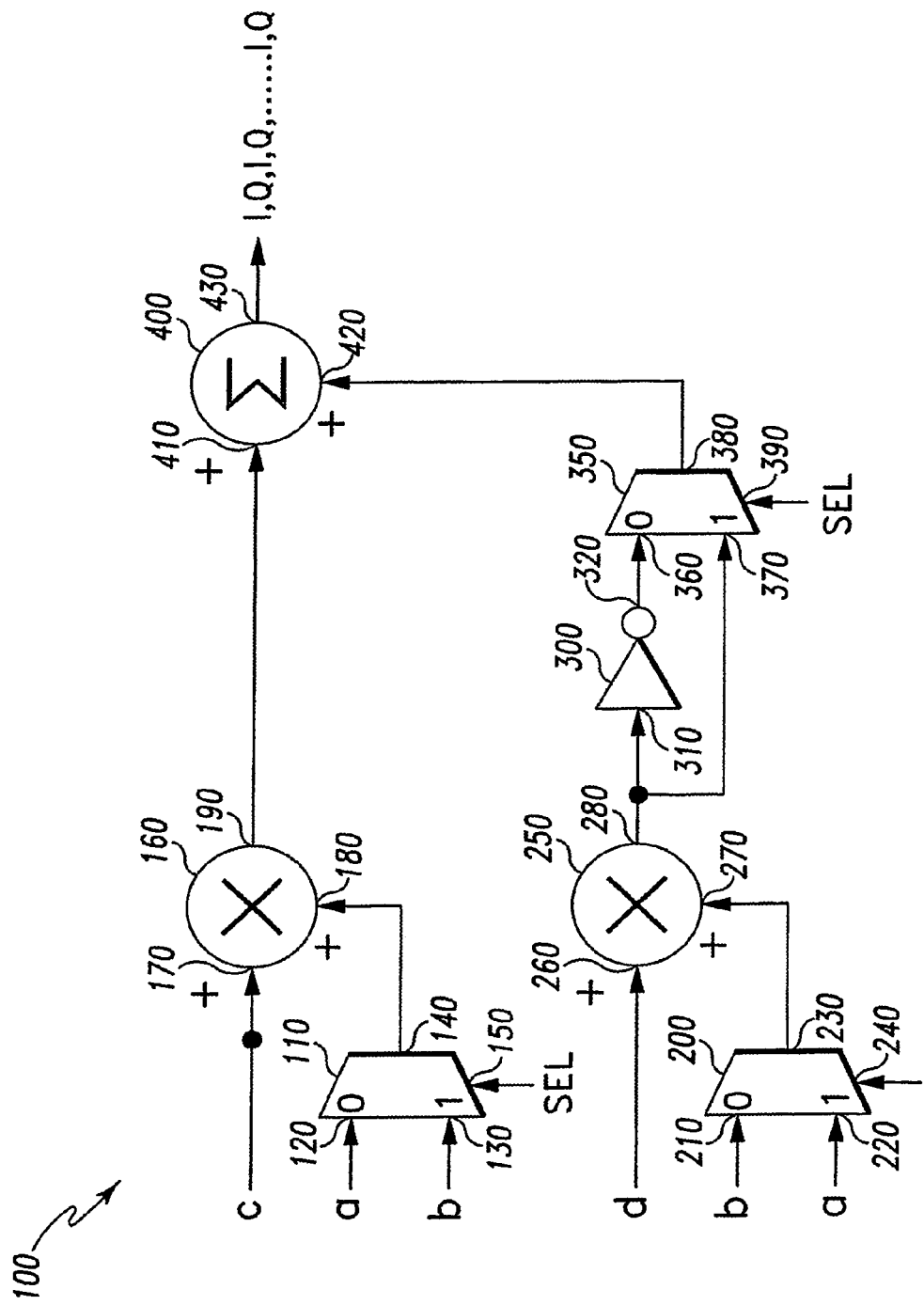
FIG. 4 is a block diagram of an exemplary alternative setup for the exemplary equalizer filter with shared multiplier of FIG. 3.

FIG. 4 is a block diagram of an exemplary alternative setup for the exemplary equalizer filter with shared multiplier 100 of FIG. 3. Like reference numerals identify like parts as between FIG. 4 and FIG. 3. In operation according to the setup of FIG. 4, equalizer filter with shared multiplier 100 provides alternating samples of (c*a) and (c*b) at data output 190 of multiplier 160, and provides alternating samples of (d*b) and (d*a) at data output 280 of multiplier 250. Through multiplexer 350, equalizer filter with shared multiplier 100 provides respective −(d*b) or +(d*a) data to summer 400. The resulting data stream at output 430 of summer 400 is a multiplexed I,Q data stream (i.e., $I_1, Q_1, I_2, Q_2, I_3, Q_3, \ldots I_{n-1}, Q_{n-1}, I_n, Q_n$), where:

$$I_n = \text{Real}[(a_n+jb_n)^*(c_n+jd_n)] = (c_n{}^*a_n) - (d_n{}^*b_n) = (a_n{}^*c_n) - (b_n{}^*d_n)$$

$$Q_n = \text{Imag}[(a_n+jb_n)^*(c_n+jd_n)] = (d_n{}^*b_n) + (d_n{}^*a_n) = (a_n{}^*d_n) + (b_n{}^*c_n)$$

It is noted that the exemplary alternative setup of FIG. 4 demonstrates that switching the locations for receiving the input data and the tap settings (compare FIG. 4 to FIG. 3) yields equivalent results.

Thus, instead of requiring a total of four complex multipliers per equalizer tap, the present invention requires only two complex multipliers. Consequently, as complex multipliers are significantly large and expensive to implement in digital integrated circuits, the present invention provides substantial benefits over the historical approach.

The invention claimed is:

1. An apparatus for OFDM communications, the apparatus comprising:
an equalizer filter configured to receive input data and to apply a tap setting to the input data to generate output data, the equalizer filter including:
a first multiplexer including a first data input, a second data input, a first data output, and a first control input, the first multiplexer arranged to receive a real component of the tap setting at the first data input, arranged to receive an imaginary component of the tap setting at the second data input, arranged to receive a control signal at the first control input, configured to provide the real component of the tap setting at the first data output in response to a first state of the control signal, and configured to provide the imaginary component of the tap setting at the first data output in response to a second state of the control signal,
a first multiplier including a third data input, a fourth data input coupled to the data output of the first multiplexer, and a second data output, the first multiplier arranged to receive a real component of the input data at the third data input, arranged to receive the provided one of the real component of the tap setting and the imaginary component of the tap setting at the fourth data input, and configured to provide a first result at the second data output, the first result corresponding to a multiplication of data received at the third data input by data received at the fourth data input,
a second multiplexer including a fifth data input, a sixth data input, a third data output, and a second control input coupled to the control input of the first multiplexer, the second multiplexer arranged to receive the imaginary component of the tap setting at the fifth data input, arranged to receive the real component of the tap setting at the sixth data input, arranged to receive the control signal at the second control input, configured to provide the imaginary component of the tap setting at the third data output in response to the first state of the control signal, and configured to provide the real component of the tap setting at the third data output in response to the second state of the control signal,
a second multiplier including a seventh data input, an eighth data input coupled to the data output of the second multiplexer, and a fourth data output, the second multiplier arranged to receive an imaginary component of the input data at the seventh data input, arranged to receive the provided one of the imaginary component of the tap setting and the real component of the tap setting at the eighth data input, and configured to provide a second result at the fourth data output, the second result corresponding to a multiplication of data received at the seventh data input by data received at the eighth data input,
an inverter including a ninth data input coupled to the data output of the second multiplier and further including a fifth data output, the inverter configured to provide a third result at the fifth data output, the third result corresponding to a magnitude of data received at the ninth data input and an opposite sign from the data received at the ninth data input,
a third multiplexer including a tenth data input coupled the data output of the inverter, an eleventh data input coupled to the data output of the second multiplier, a sixth data output, and a third control input coupled to the control input of the first multiplexer and the control input of the second multiplexer, the third multiplexer arranged to receive the control signal at the third control input, configured to provide data received at the tenth data input at the sixth data output in response to the first state of the control signal, and configured to provide data received at the eleventh data input at the sixth data output in response to the second state of the control signal, and
a summer including a twelfth data input coupled to the data output of the first multiplier, a thirteenth data input coupled to the data output of the third multiplexer, and a seventh data output, the summer configured to provide the output data at the seventh data output, the output data including a plurality of pairs of time-multiplexed components, each pair including exactly one real component and exactly one imaginary component.

2. A method for OFDM communications, the method comprising the steps of:
receiving input data, the input data including a real component and an imaginary component;

multiplexing a real component of a tap setting and an imaginary component of the tap setting to generate a first result;

generating a second result corresponding to a multiplication of the real component of the input data by the first result;

multiplexing the imaginary component of the tap setting and the real component of the tap setting to generate a third result;

generating a fourth result corresponding to a multiplication of the imaginary component of the input data by the third result;

generating a fifth result corresponding to a magnitude of the fourth result and corresponding to an opposite sign from the fourth result;

multiplexing the fourth result and the fifth result to generate a sixth result, and summing the second result with the sixth result to generate output data, the output data including a plurality of pairs of time-multiplexed components, each pair including exactly one real component and exactly one imaginary component; and wherein the method is performed in an equalizer filter, the equalizer filter including a plurality of multiplexers.

3. An apparatus for OFDM communications, the apparatus comprising:

an equalizer filter configured to receive input data and to apply a tap setting to the input data to generate output data, the equalizer filter including:

a first multiplexer including a first data input, a second data input, a first data output, and a first control input, the first multiplexer arranged to receive a real component of the input data at the first data input, arranged to receive an imaginary component of the input data at the second data input, arranged to receive a control signal at the first control input, configured to provide the real component of the input data at the first data output in response to a first state of the control signal, and configured to provide the imaginary component of the input data at the first data output in response to a second state of the control signal, a first multiplier including a third data input, a fourth data input coupled to the data output of the first multiplexer, and a second data output, the first multiplier arranged to receive a real component of the tap setting at the third data input, arranged to receive the provided one of the real component of the input data and the imaginary component of the input data at the fourth data input, and configured to provide a first result at the second data output, the first result corresponding to a multiplication of data received at the third data input by data received at the fourth data input, a second multiplexer including a fifth data input, a sixth data input, a third data output, and a second control input coupled to the control input of the first multiplexer, the second multiplexer arranged to receive an imaginary component of the input data at the fifth data input, arranged to receive the real component of the input data at the sixth data input, arranged to receive the control signal at the second control input, configured to provide the imaginary component of the input data at the third data output in response to the first state of the control signal, and configured to provide the real component of the input data at the third data output in response to the second state of the control signal, a second multiplier including a seventh data input, an eighth data input coupled to the data output of the second multiplexer, and a fourth data output, the second multiplier arranged to receive the imaginary component of the tap setting at the seventh data input, arranged to receive the provided one of the imaginary component of the input data and the real component of the input data at the eighth data input, and configured to provide a second result at the fourth data output, the second result corresponding to a multiplication of data received at the seventh data input by data received at the eighth data input, an inverter including a ninth data input coupled to the data output of the second multiplier and further including a fifth data output, the inverter configured to provide a third result at the fifth data output, the third result corresponding to a magnitude of data received at the ninth data input and an opposite sign from the data received at the ninth data input, a third multiplexer including a tenth data input coupled the data output of the inverter, an eleventh data input coupled to the data output of the second multiplier, a sixth data output, and a third control input coupled to the control input of the first multiplexer and the control input of the second multiplexer, the third multiplexer arranged to receive the control signal at the third control input, configured to provide data received at the tenth data input at the sixth data output in response to the first state of the control signal, and configured to provide data received at the eleventh data input at the sixth data output in response to the second state of the control signal, and a summer including a twelfth data input coupled to the data output of the first multiplier, a thirteenth data input coupled to the data output of the third multiplexer, and a seventh data output, the summer configured to provide the output data at the seventh data output, the output data including a plurality of pairs of time-multiplexed components, each pair including exactly one real component and exactly one imaginary component.

4. A method for OFDM communications, the method comprising the steps of:

receiving input data, the input data including a real component and an imaginary component;

multiplexing the real component of the input data and the imaginary component of the input data to generate a first result;

generating a second result corresponding to a multiplication of a real component of a tap setting by the first result;

multiplexing the imaginary component of the input data and the real component of the input data to generate a third result;

generating a fourth result corresponding to a multiplication of an imaginary component of the tap setting by the third result;

generating a fifth result corresponding to a magnitude of the fourth result and corresponding to an opposite sign from the fourth result;

multiplexing the fourth result and the fifth result to generate a sixth result; and summing the second result with the sixth result to generate output data, the output data including a plurality of pairs of time-multiplexed components, each pair including exactly one real component and exactly one imaginary component; and wherein the method is performed in an equalizer filter, the equalizer filter including a plurality of multiplexers.

* * * * *